United States Patent
Lee et al.

(10) Patent No.: US 12,076,618 B2
(45) Date of Patent: Sep. 3, 2024

(54) ELECTRONIC DEVICE FOR PROVIDING REAL-TIME SPEED BASED ON GPS SIGNAL AND/OR PEDOMETER INFORMATION, AND METHOD OF CONTROLLING THE SAME

(71) Applicant: Samsung Electronics Co., Ltd., Gyeonggi-do (KR)

(72) Inventors: Chaeheun Lee, Gyeonggi-do (KR); Museop Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 405 days.

(21) Appl. No.: 17/511,745

(22) Filed: Oct. 27, 2021

(65) Prior Publication Data

US 2022/0137239 A1    May 5, 2022

Related U.S. Application Data

(63) Continuation of application No. PCT/KR2021/015103, filed on Oct. 26, 2021.

(30) Foreign Application Priority Data

Oct. 30, 2020 (KR) .................. 10-2020-0143821

(51) Int. Cl.
*A63B 24/00* (2006.01)
*G01C 22/00* (2006.01)

(52) U.S. Cl.
CPC ........ *A63B 24/0062* (2013.01); *G01C 22/006* (2013.01)

(58) Field of Classification Search
None
See application file for complete search history.

(56) References Cited

U.S. PATENT DOCUMENTS 5,583,776 A * 12/1996 Levi ................. G06V 40/25
701/400
6,122,960 A * 9/2000 Hutchings ........... G01C 22/006
73/865.4

(Continued)

FOREIGN PATENT DOCUMENTS

JP    2012-95319 A    5/2012
JP    2017-156267 A   9/2017

(Continued)

OTHER PUBLICATIONS

"Our Brands: Who We Are"; posted on the website of the Wi-Fi Alliance at www.wi-fi.org; no author indicated; no date indicated; copyright in the year 2024. (Year: 2024).*

(Continued)

*Primary Examiner* — Bernarr E Gregory
(74) *Attorney, Agent, or Firm* — Cha & Reiter, LLC

(57) ABSTRACT

According to various embodiments, an electronic device may include a communication circuit, an acceleration sensor, and at least one processor, and the at least one processor may be configured to identify a first movement speed of the electronic device by using the communication circuit, identify a step frequency of a user by using the acceleration sensor, identify a movement type of the user based on the identified step frequency, and output a movement speed of the electronic device by calibrating the first movement speed based on the identified movement type.

20 Claims, 13 Drawing Sheets

(56) References Cited

U.S. PATENT DOCUMENTS

| | | | |
|---|---|---|---|
| 7,057,551 B1* | 6/2006 | Vogt | G01S 19/19 |
| | | | 701/472 |
| 9,734,304 B2* | 8/2017 | Blackadar | A61B 5/1123 |
| 2005/0033200 A1* | 2/2005 | Soehren | A61B 5/1117 |
| | | | 600/595 |
| 2007/0208532 A1 | 9/2007 | Park et al. | |
| 2008/0120062 A1 | 5/2008 | Lee et al. | |
| 2009/0043531 A1* | 2/2009 | Kahn | A63B 24/0062 |
| | | | 702/149 |
| 2009/0192708 A1 | 7/2009 | Yoo et al. | |
| 2010/0214216 A1* | 8/2010 | Nasiri | G06F 3/0346 |
| | | | 345/158 |
| 2013/0080255 A1 | 3/2013 | Li et al. | |
| 2013/0090881 A1* | 4/2013 | Janardhanan | G01C 21/18 |
| | | | 702/104 |
| 2014/0129177 A1 | 5/2014 | Gyorfi et al. | |
| 2014/0316305 A1 | 10/2014 | Venkatraman et al. | |
| 2016/0322078 A1* | 11/2016 | Bose | A63B 24/0062 |
| 2018/0275157 A1* | 9/2018 | Ebesu | G01C 22/006 |
| 2018/0372500 A1 | 12/2018 | Xu et al. | |

FOREIGN PATENT DOCUMENTS

| | | |
|---|---|---|
| JP | 2018-77239 A | 5/2018 |
| KR | 10-2002-0001257 A | 1/2002 |
| KR | 10-0703292 B1 | 3/2007 |
| KR | 10-2008-0051665 A | 6/2008 |
| KR | 10-2009-0082711 A | 7/2009 |
| KR | 10-0978060 B1 | 8/2010 |
| KR | 10-2011-0068340 A | 6/2011 |
| KR | 10-2017-0010593 A | 2/2017 |

OTHER PUBLICATIONS

International Search Report dated Feb. 3, 2022.

* cited by examiner

ELECTRONIC DEVICE FOR PROVIDING REAL-TIME SPEED BASED ON GPS SIGNAL AND/OR PEDOMETER INFORMATION, AND METHOD OF CONTROLLING THE SAME

CROSS-REFERENCE TO RELATED APPLICATION(S)

This application is a continuation application, claiming priority under § 365(c), of an International application No. PCT/KR2021/015103, filed on Oct. 26, 2021, which was based on and claimed the benefit of an Korean patent application Serial number 10-2020-0143821, filed on Oct. 30, 2020 in the Korean Intellectual Property Office, the disclosures of each of which is incorporated by reference herein in its entirety.

TECHNICAL FIELD

Various embodiments of the disclosure relate to an electronic device providing real-time velocity based on a global positioning system (GPS) signal and/or pedometer information, and a method of controlling the same.

BACKGROUND ART

There has been an increase in the diversity of services and functions now provided through electronic devices, such as, for example, portable devices, including smart phones. To increase the utilization of electronic devices and satisfy various user demands, communication service providers and/or electronic device manufacturers are competitively developing electronic devices to provide various functions and differentiate them from other companies. Accordingly, various functions provided through the electronic devices are also increasingly advanced.

SUMMARY

An electronic device may measure, in real time, the movement speed of a user who is moving while carrying the electronic device on his person, using a global positioning system (GPS) module, and provide the measured velocity. For example, the electronic device may detect a GPS signal received from the outside and estimate and/or identify the movement speed of the electronic device and the user based on the principle that when an electronic device moves, the length and/or phase of the wavelength of a detected GPS signal changes (i.e., the Doppler shift effect). A method of measuring a movement speed in real time by a GPS module may provide an accurate real-time movement speed in an open sky with a good quality of a GPS signal (e.g., an environment in which visibility with satellites transmitting GPS signals is secured). However, for example, in an environment in which visibility with the satellites transmitting GPS signals is not secured, such as a downtown area densely populated with high buildings, the measurement accuracy of the movement speed may be low. When the user moves slowly such as walking, a real-time movement speed may be difficult to measure because the measurement accuracy of a slow speed is low in view of the limitations of the Doppler shift-based method.

The electronic device may detect a number of steps taken by the user while carrying the electronic device, estimate a step length of the user, and estimate the movement speed of the user using an acceleration sensor. For example, the electronic device may estimate the step length of the user based on pre-input biometric information (e.g., a profile) about the user and estimate and/or identify the movement speed of the electronic device and the user based on the estimated step length and the detected number of steps that the user has taken. This method of measuring a movement speed in real time based on the number of steps of a user and biometric information about the user may advantageously provide real-time movement speed measurement, with relatively small power consumption, and may be less affected by a measurement location. However, each individual may have a different step length, and even the same user may move with different step lengths depending on a situation. Accordingly, it may be difficult to provide an accurate real-time movement speed.

According to various embodiments, an electronic device for providing a real-time movement speed by calibrating a speed measured based on a GPS signal according to context information which is based on a step frequency (e.g., the number of steps per unit time) of a user, and a method of controlling the same may be provided.

According to various embodiments, an electronic device for estimating a real-time movement speed based on a step length of a user, as learned based on a GPS signal and a method of controlling the same may be provided.

According to various embodiments, an electronic device for identifying a real-time movement speed by combining a speed measured based on a GPS signal and a speed estimated based on a learned step length, and a method of controlling the same may be provided.

According to various embodiments, an electronic device may include a communication circuit, an acceleration sensor, and at least one processor, and the at least one processor may be configured to identify a first movement speed of the electronic device using the communication circuit, identify a step frequency of a user by using the acceleration sensor, identify a movement type of the user based on the identified step frequency, and output a velocity of the electronic device by calibrating the first movement speed based on the identified movement type.

According to various embodiments, a method of controlling an electronic device may include identifying a first movement speed of the electronic device using a communication circuit of the electronic device, identifying a step frequency of a user by using an acceleration sensor of the electronic device, identifying a movement type of the user based on the identified step frequency, and outputting a movement speed of the electronic device by calibrating the first movement speed based on the identified movement type.

According to various embodiments, an electronic device may include a communication circuit, an acceleration sensor, and at least one processor, and the at least one processor may be configured to identify a first movement speed of the electronic device by using the communication circuit, identify a step frequency of a user by using the acceleration sensor, calibrate the first movement speed based on the identified step frequency, identify a second movement speed of the electronic device by using the acceleration sensor, and output a movement speed of the electronic device based on the calibrated first movement speed and the second movement speed.

According to various embodiments, when a movement type of a user is maintained or changed, an electronic device may provide a real-time movement speed calibrated in correspondence with a situation in which the user identifies the movement speed.

According to various embodiments, an electronic device may provide a real-time movement speed corresponding to a movement type of a user by using a learned step length.

According to various embodiments, an electronic device may provide an accurate real-time movement speed based on a weight assigned according to the quality of a global positioning system (GPS) signal, a movement type of a user, and/or whether a step length has been learned.

Various effects exerted by the present disclosure are not limited to the above-described effects.

DETAILED DESCRIPTION

Figure 1:
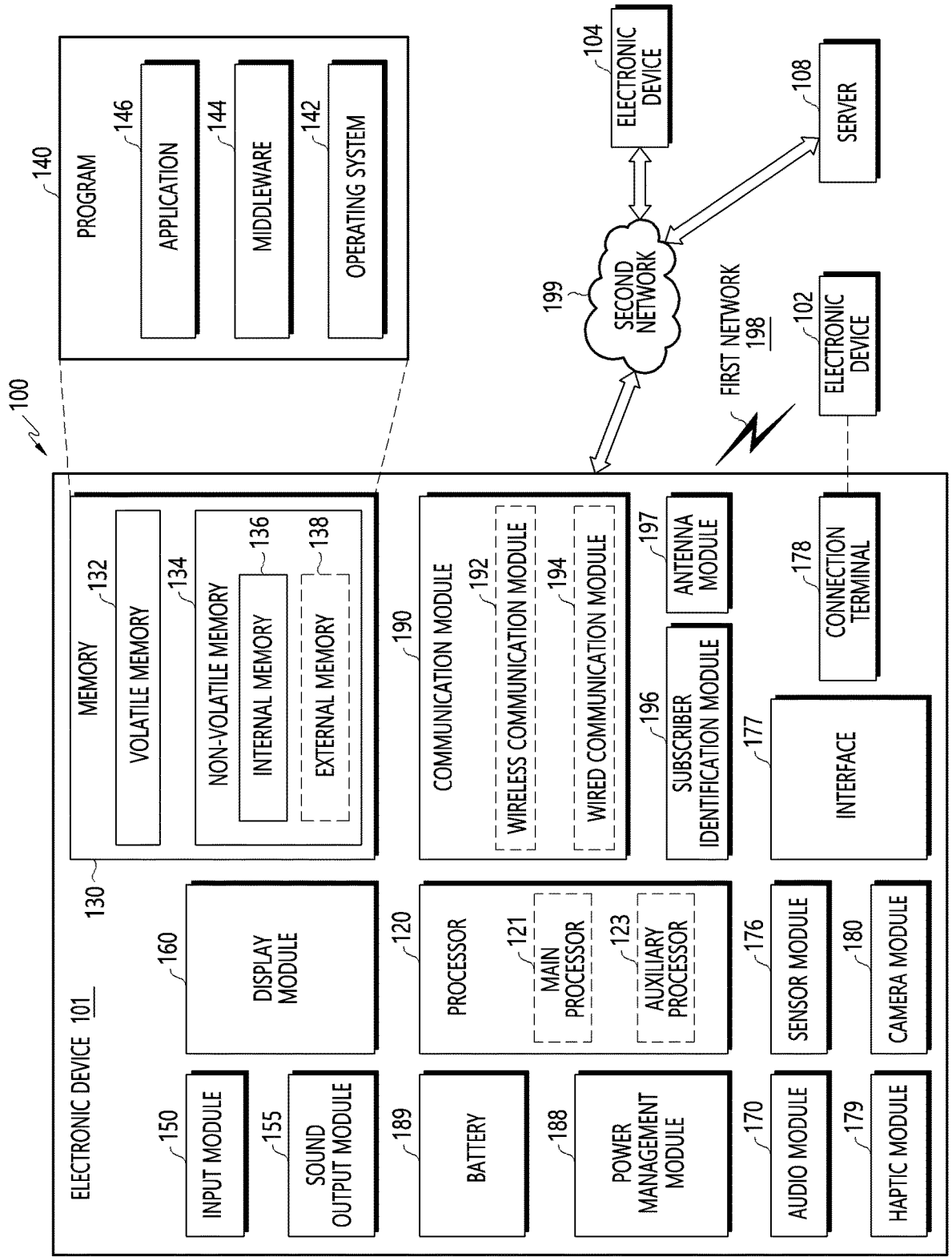
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
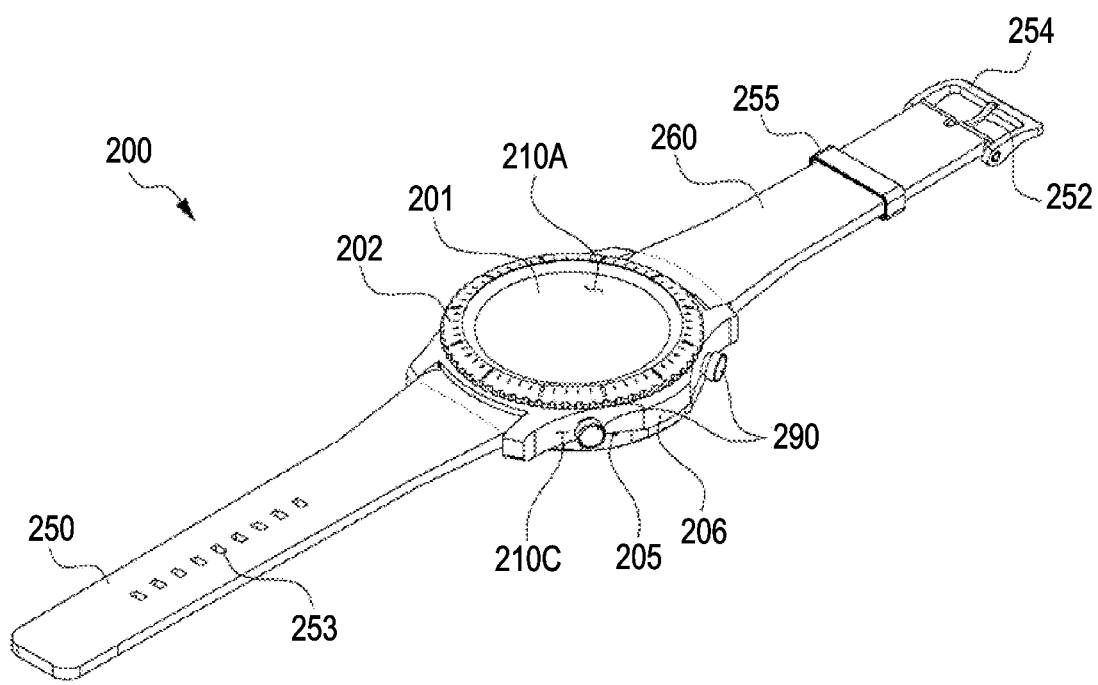
FIG. 2 is a perspective view illustrating the front surface of an electronic device according to various embodiments.
Figure 3:
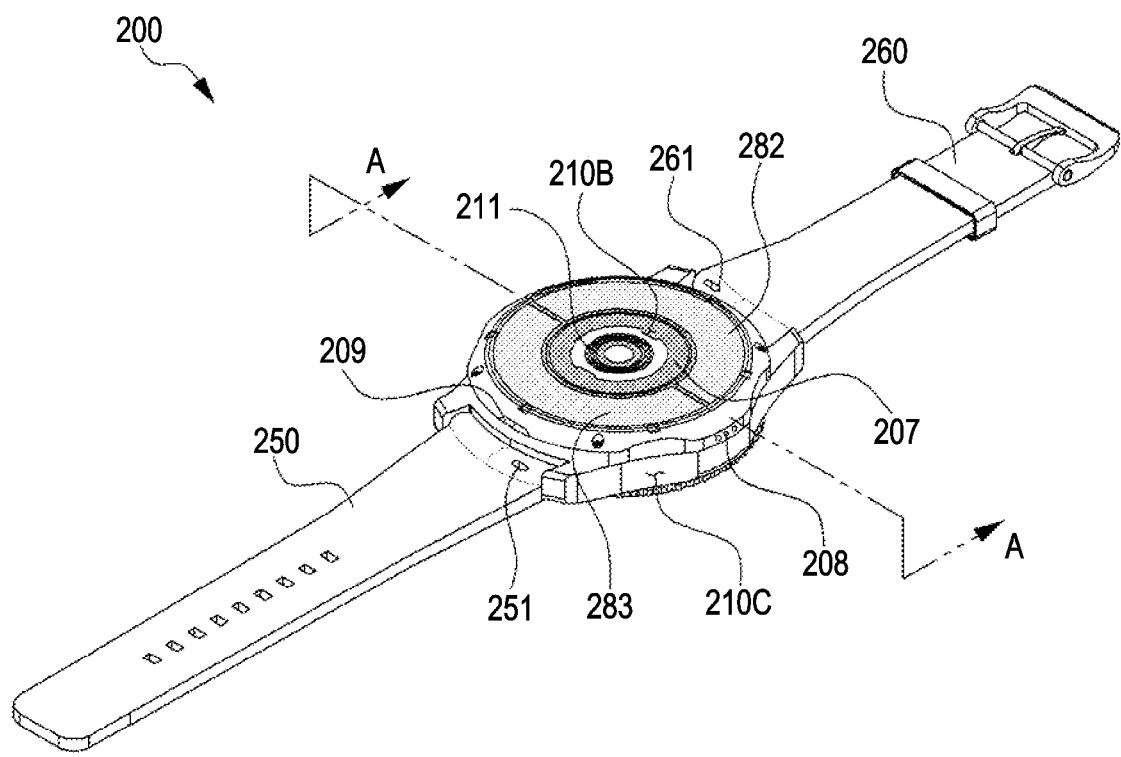
FIG. 3 is a perspective view illustrating the rear surface of the electronic device illustrated in FIG. 2.
Figure 4:
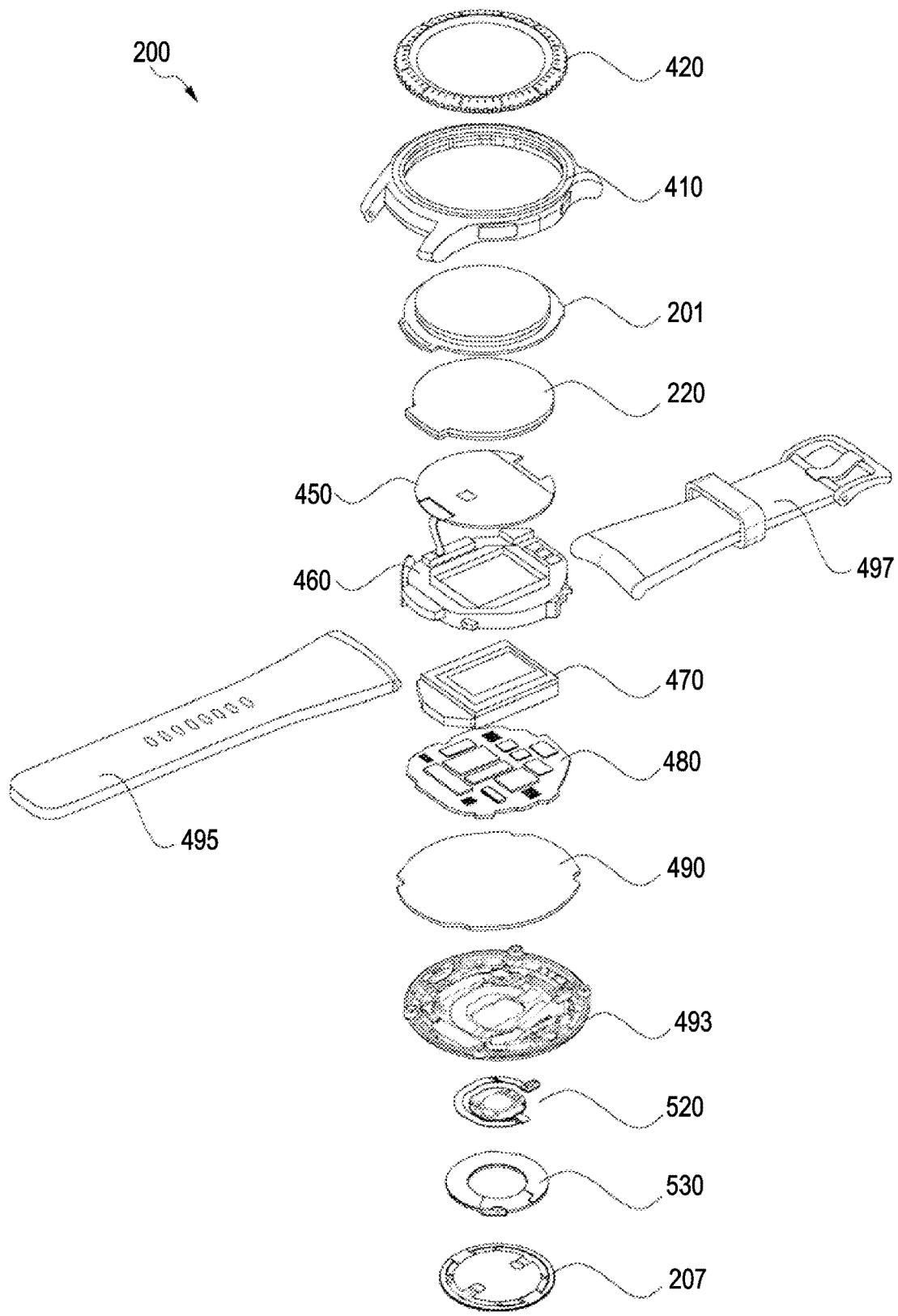
FIG. 4 is an exploded perspective view illustrating the electronic device illustrated in FIG. 2.

FIG. 2 is a perspective view illustrating the front surface of a mobile electronic device according to various embodiments. FIG. 3 is a perspective view illustrating the rear surface of the electronic device of FIG. 2. FIG. 4 is an exploded perspective view illustrating the electronic device of FIG. 2.

Referring to FIGS. 2 and 3, an electronic device 200 (e.g., the electronic device 101 in FIG. 1) according to an embodiment may include a housing 210 which includes a first surface (or front surface) 210A, a second surface (or rear surface) 210B, and a side surface 210C surrounding a space between the first surface 210A and the second surface 210B, and fastening members 250 and 260 each being coupled to at least a part of the housing 210 and configured to detachably couple the electronic device 200 to a user's body part (e.g., a wrist, an ankle, or the like). In another embodiment (not shown), the housing may refer to a structure forming parts of the first surface 210A, the second surface 210B, and the side surface 210C illustrated in FIG. 2. According to an embodiment, the first surface 210A may be formed by a front plate 201 (e.g., a glass plate or polymer plate including various coating layers) which is substantially and/or at least partially transparent. The second surface 210B may be formed by a substantially opaque rear cover 207. The rear cover 207 may be formed of, for example, coated or tinted glass, ceramic, polymer, metal (e.g., aluminum, stainless steel (STS), or magnesium), or a combination of at least two of these materials. The side surface 210C may be coupled with the front plate 201, and the rear cover 207 and formed by a side bezel structure (or "side member") 206 including metal and/or polymer. In some embodiments, the rear cover 207 and the side bezel structure 206 may be integrally formed and include the same material (e.g., a metal material such as aluminum). The fastening members 250 and 260 may be formed of various materials in various shapes. For the fastening members 250 and 260, an integrated unit link or a plurality of unit links may be movably formed of woven fabric, leather, rubber, urethane, metal, ceramic, or a combination of at least two of these materials.

According to an embodiment, electrodes 282 and 283 may be formed of a conductive material in one region of the rear cover 207 of the electronic device 200.

According to an embodiment, the electronic device 200 may include at least one of a display 220 (see FIG. 4) (e.g., the display module 160 in FIG. 1), audio modules 205 and 208 (e.g., the audio module 170 in FIG. 1), a sensor module 211 (e.g., the sensor module 176 in FIG. 1), key input devices 202 and 290, or a connector hole 209. In some embodiments, the electronic device 200 may not be provided with at least one (e.g., the key input devices 202 and 290, the connector hole 209, or the sensor module 211) of the components or may further include another component.

The display 220 may be exposed, for example, through a substantial part of the front plate 201. The display 220 may be formed in a shape corresponding to the shape of the front plate 201, and various shapes such as a circle, an oval, or a polygon may be available for forming the display 220. The display 220 may be incorporated (e.g., integrated) with or disposed adjacent to a touch sensing circuit, a pressure sensor that measures the intensity (pressure) of a touch, and/or a fingerprint sensor.

The audio modules 205 and 208 may include a microphone hole and a speaker hole. A microphone for receiving an external sound may be disposed in the microphone hole, and in some embodiments, a plurality of microphones may be disposed to detect directionality of the sound. The speaker hole may be used with a speaker (e.g., as part of a receiver) for executing calls. In some embodiments, the speaker hole and the microphone hole may be implemented as a single hole, or a speaker (e.g., a piezo speaker) may be included without the speaker hole.

The sensor module 211 may generate an electrical signal or data value corresponding to an internal operation state or external environmental state of the electronic device 200. The sensor module 211 may include, for example, a biometric sensor module 211 (e.g., a heart rate monitor (HRM) sensor) disposed on the second surface 210B of the housing 210. The electronic device 200 may further include a sensor module (not shown), for example, at least one of a gesture sensor, a gyro sensor, a barometric pressure sensor, a magnetic sensor, an acceleration sensor, a grip sensor, a color sensor, an IR sensor, a biosensor, a temperature sensor, a humidity sensor, or an illuminance sensor.

The key input devices 202 and 290 may include a wheel key 202 disposed on the first surface 210A of the housing 210 and rotatable in at least one direction, and/or side key buttons 290 disposed on the side surface 210C of the housing 210. The wheel key 202 may be formed in a shape corresponding to the shape of the front plate 201. In another embodiment, the electronic device 200 may not include some or any of the above key input devices 202 and 290, and the key input devices 202 and 290 which are not included may be implemented in other forms, such as soft keys on the display 220. The connector hole 209 may include other connector holes (not shown) for accommodating a connector (e.g., a universal serial bus (USB) connector) for transmitting and receiving power and/or data to and from an external electronic device, and a connector for transmitting/receiving an audio signal to and from an external electronic device. The electronic device 200 may further include, for example, a connector cover (not shown) that covers at least a part of the connector hole 209, and blocks the introduction of a foreign material into the connector hole 209.

The fastening members 250 and 260 may be detachably coupled to portions of the housing 210 by locking members 251 and 261. The fastening members 250 and 260 may include one or more of a fixing member 252, fixing member fastening holes 253, a band guide member 254, and a band fixing loop 255.

The fixing member 252 may be configured to fix the housing 210 and the fastening members 250 and 260 to the user's body part (e.g., a wrist, an ankle, or the like). The fixing member fastening holes 253 may fix the housing 210 and the fastening members 250 and 260 to the user's body part in correspondence with the fixing member 252. The band guide member 254 may be configured to limit a motion range of the fixing member 252, when the fixing member 252 is fastened with a fixing member fastening hole 253, so that the fastening members 250 and 260 are closely attached to the user's body part. The band fixing loop 255 may limit motion ranges of the fixing members 250 and 260, with the fixing member 252 fit into the fixing member fastening hole 253.

Referring to FIG. 4, the electronic device 200 may include a side bezel structure 410, a wheel key 420, the front plate 201, the display 220, a first antenna 450 (e.g., the antenna module 197 in FIG. 1), a support member 460 (e.g., a bracket), a battery 470 (e.g., the battery 189 in FIG. 1), a first printed circuit board 480, a sealing member 490, a rear plate 493, and fastening members 495 and 497. At least one of the components of the electronic device 200 illustrated in FIG. 4 may be identical or similar to at least one of the components of the electronic device 200 illustrated in FIG. 2 or FIG. 3, and a redundant description will be avoided herein. The support member 460 may be mounted inside the electronic device 200 and coupled to the side bezel structure 410, or may be integrally formed with the side bezel structure 410. The support member 460 may be formed of, for example, a metal material and/or a non-metal (e.g., polymer) material. The support member 460 may be coupled to the display 220 on one surface thereof and to the first printed circuit board 480 on the other surface thereof. A processor (e.g., the processor 120 in FIG. 1), a memory (e.g., the memory 130 in FIG. 1), and/or an interface (e.g., the interface 177 in FIG. 1) may be mounted on the first printed circuit board 480. The processor may include, for example, one or more of a central processing unit, an application processor, a graphic processing unit (GPU), a sensor processor, and a communication processor.

The memory may include, for example, a volatile memory or a non-volatile memory. The interface may include, for example, a high-definition multimedia interface (HDMI), a USB interface, a secure digital (SD) card interface, and/or an audio interface. The interface may, for example, electrically or physically couple the electronic device 200 to an external electronic device, and include a USB connector, an SD card/multimedia card (MMC) connector, or an audio connector.

The battery 470 is a device for supplying power to at least one component of the electronic device 200, and may include, for example, a non-rechargeable primary battery, a rechargeable secondary battery, or a fuel cell. At least a part of the battery 470 may be disposed substantially on the same plane as, for example, the first printed circuit board 480. The battery 470 may be integrally disposed inside the electronic device 200 or may be disposed detachably in the electronic device 200.

The first antenna 450 may be disposed between the display 220 and the support member 460. The first antenna 450 may include, for example, a near field communication (NFC) antenna, a wireless charging antenna, and/or a magnetic secure transmission (MST) antenna. The first antenna 450 may, for example, perform short-range communication with an external device, wirelessly transmit and receive power utilized for charging, and transmit a magnetic-based signal including a short-range communication signal or payment data. In another embodiment, an antenna structure may be formed by a part of the side bezel structure 410 and/or the support member 460 or a combination thereof.

The sealing member 490 may be located between the side bezel structure 410 and the rear plate 493. The sealing member 490 may be configured to block the introduction of moisture and a foreign material from the outside into a space surrounded by the side bezel structure 410 and the rear plate 493.

Figure 5A:
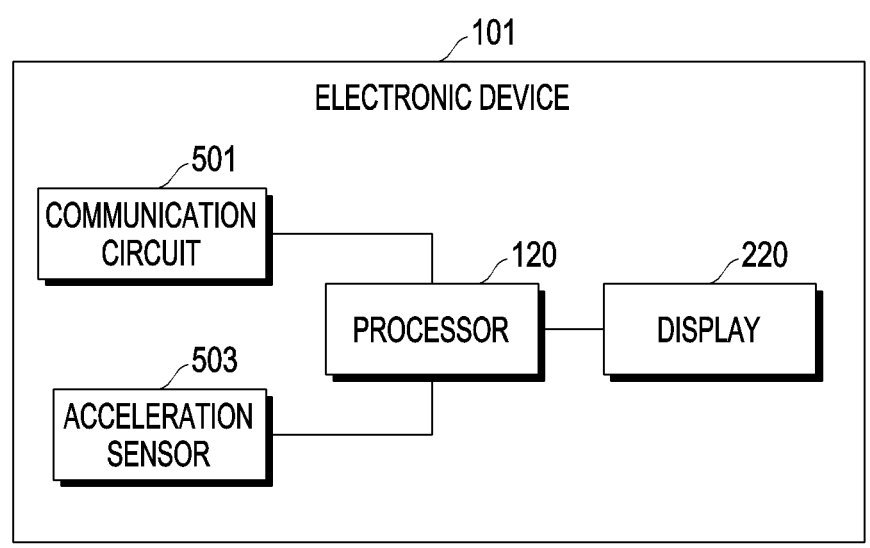
FIG. 5A is a block diagram illustrating components of an electronic device 101 according to various embodiments.
Figure 5B:
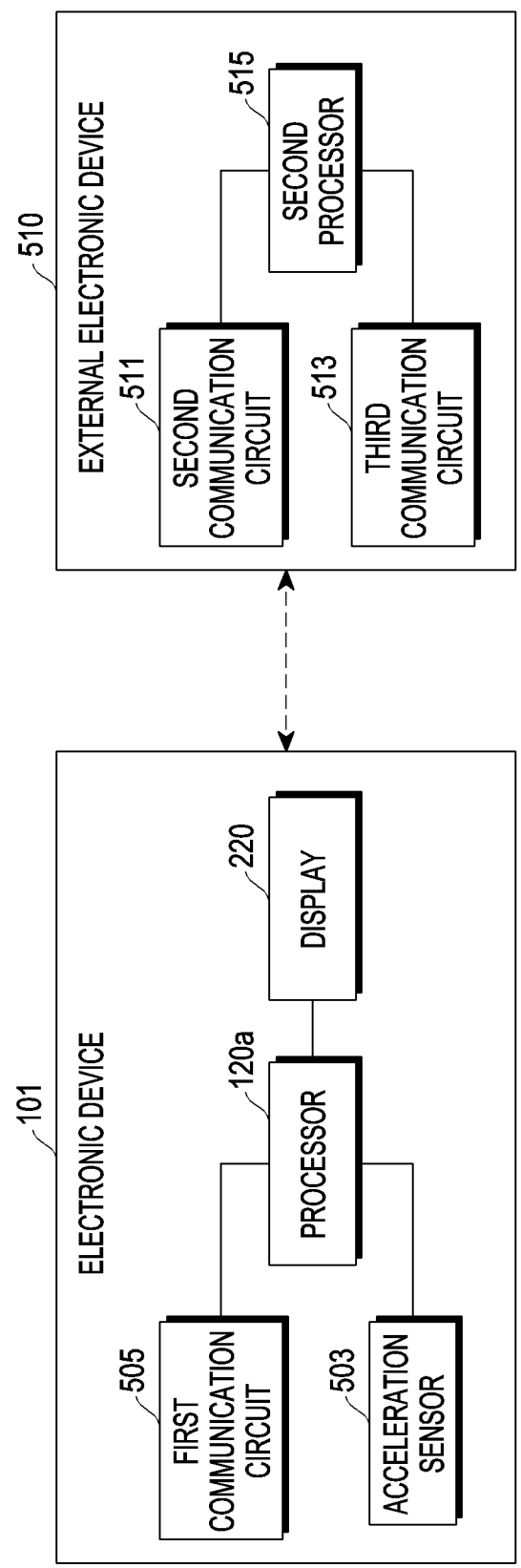
FIG. 5B is a block diagram illustrating components of an electronic device and components of an external electronic device according to various embodiments.

FIG. 5A is a block diagram illustrating components of the electronic device 101 according to various embodiments. FIG. 5B is a block diagram illustrating components of the electronic device 101 and components of an external electronic device 510 (e.g., the electronic devices 102 and 104 in FIG. 1) according to various embodiments.

Referring to FIG. 5A, according to various embodiments, the electronic device 101 may include a communication circuit 501 (e.g., the wireless communication module 192 in FIG. 1) and an acceleration sensor 503 (e.g., the sensor module 176, the processor 120, and/or the display 220).

According to various embodiments, the communication circuit 501 may transmit and/or receive a communication signal to and/or from the outside. The communication circuit 501 may include, for example, a global navigation satellite system (GNSS) communication module (e.g., a GPS module).

According to various embodiments, the acceleration sensor 503 may measure the acceleration of the electronic device 101 and convert information about the measured acceleration into an electrical signal.

According to various embodiments, the processor 120 may perform and/or control overall operations of the electronic device 101. For example, the processor 120 may perform a specified operation of the electronic device 101 or may control other hardware (e.g., the communication circuit 501) to perform the specified operation.

According to various embodiments, the processor 120 may identify the location of the electronic device 101. For example, the processor 120 may control the communication circuit 501 to receive GPS signals from the outside (e.g., three or more satellites). The processor 120 may identify distance information from the electronic device 101 to the satellites that have transmitted the GPS signals, based on time information included in each of the GPS signals received from the outside. The processor 120 may identify real-time location information about the electronic device 101 from distance information corresponding to each of the satellites that have transmitted the GPS signals, for example, based on triangulation.

According to various embodiments, the processor 120 may identify a movement state (e.g., a movement distance and/or a movement direction) of the electronic device 101. For example, the processor 120 may identify a distance that the electronic device 101 has moved during a predetermined time by tracking and accumulating real-time location information about the electronic device 101. For example, the processor 120 may track the real-time location information about the electronic device 101, identify a straight line direction in which the location of the electronic device 101 has moved at every predetermined time interval, and identify the movement direction of the electronic device 101 based on the identified straight line directions.

According to various embodiments, the processor 120 may identify pedometer information (e.g., the number of steps and/or a step frequency of the user) of the electronic device 101 by using the acceleration sensor 503. For example, the processor 120 may identify the acceleration of the electronic device 101 by using the acceleration sensor 503. The processor 120 may identify x-axis, y-axis, and z-axis components of the identified acceleration and identify time points (e.g., zero-crossing) at which the magnitude (e.g., norm) of at least one of the identified components becomes 0. The processor 120 may identify the number of steps of the user by identifying time points when the magnitude of at least one of the identified components becomes 0. For example, when the user carrying the electronic device 101 walks or runs, a time point when at least one of the x-axis, y-axis, and z-axis components of the acceleration becomes 0 may indicate the user's foot contacting the ground by a step. The processor 120 may identify time points when the user steps on the ground by identifying time points when the magnitude of at least one of the x-axis, y-axis, and z-axis components of the acceleration becomes 0, and count the number of steps of the user from the identified time points. The processor 120 may identify the step frequency (e.g., the number of steps per unit time) of the user from the average number of steps (or zero-crossing rate) of the user identified during a predetermined time. For example, when the identified number of steps of the user for one second is 2.5, the step frequency of the user may be identified as 2.5 Hz.

According to various embodiments, the processor 120 may identify the movement speed of the electronic device 101.

For example, the processor 120 may identify the movement speed of the electronic device 101 by identifying a distance that the electronic device 101 has traveled within a predetermined time based on real-time location information about the electronic device 101. For example, on the assumption that the electronic device 101 receives GPS signals every one second, a distance that the electronic device 101 has moved for one second may be identified by using location information at the time when the GPS signals have been received and location information at the time the GPS signals have been received after one second, and the movement speed of the electronic device 101 may be identified from the distance.

For example, the processor 120 may identify the movement speed of the electronic device 101 based on the Doppler effect (e.g., a Doppler shift). For example, when the user carrying the electronic device 101 walks or runs, the lengths and/or phases of the wavelengths of GPS signals received by the electronic device 101 may change. The processor 120 may identify the movement speed of the electronic device 101 by identifying a variation in the lengths and/or phases of the wavelengths of the received GPS signals. For example, the movement speed of the electronic device 101 may be identified in every period in which the electronic device 101 receives GPS signals.

For example, the processor 120 may identify the movement speed of the electronic device 101 (e.g., hereinafter, a "second movement speed"). The second movement speed may be identified based on pedometer information (e.g., the number of steps and/or the step frequency of the user) identified by using the acceleration sensor 503. For example, the processor 120 may identify the movement speed of the electronic device 101 by multiplying the step frequency of the user by the step length of the user. For example, the step length of the user, which is a step learned in correspondence with the step frequency of the user, may be estimated from a scale factor stored in a memory (e.g., the memory 130 in FIG. 1), which will be described in detail with reference to the drawings. In another example, the step length of the user may be estimated from biometric information (e.g., a height) for the user, and the biometric information about the user may be a value pre-input by the user.

According to various embodiments, the processor 120 may calibrate a movement speed measured based on GPS signals. For example, the processor 120 may calibrate (e.g., filter or smooth) a real-time movement speed (hereinafter, referred to as a first movement speed) identified by using real-time location information and/or the Doppler effect (e.g., Doppler shift) of the electronic device 101. The processor 120 may determine how much the first movement speed is to be calibrated based on context information according to the step frequency of the user. In various embodiments of the disclosure, strong calibration (e.g., filtering or smoothing) means increasing the number of speed samples (e.g., a window size) for calibrating the first movement speed, which amounts to calculating the average value of a larger number of first movement speeds as a calibrated first movement speed. In various embodiments of the disclosure, weak calibration (e.g., filtering or smoothing) means that the number of speed samples for calibrating the first movement speed is decreased, which amounts to calculating the average value of a smaller number of first movement speeds as a calibrated first movement speed. The processor 120 may identify the movement type of the user (e.g., a stationary state, a walking state, or a running state) according to the step frequency, and determine a calibration degree according to the identified movement type, which will be described in more detail with reference to the drawings.

According to various embodiments, the processor 120 may combine the movement speed (e.g., the first movement speed before the calibration or the calibrated first movement speed) identified based on the GPS signals and the movement speed (e.g., the second movement speed) identified by using the acceleration sensor. For example, the processor 120 may determine weights for the movement speed (e.g., the first movement speed before the calibration or the calibrated first movement speed) identified based on the GPS signals and the movement speed (e.g., the second movement speed) identified by using the acceleration sensor based on at least one of the qualities of signals (e.g., GPS signals) received through the communication circuit 501 (e.g., the strengths of the GPS signals or the carrier to noise ratios (CNRs) of the GPS signals, a GPS speed estimation error covariance value, or the number and/or number change of satellites that have transmitted the received GPS signals), whether a step-based speed (e.g., the second movement speed) has been learned, or a movement path (e.g. a straight path or a curved path) of the electronic device 101, and identify a movement speed to be output through an output device (e.g., the display 220) based on the determined weights.

According to various embodiments, the processor 120 may display information about the movement state of the user on the display 220. For example, the information about the movement state may include at least one of information about a movement type, distance information (e.g. a target distance and/or a remaining distance to a target, speed information (e.g., a real-time speed and/or an average speed), or time information. (e.g., a running time and/or the remaining time to the target). According to various embodiments, the electronic device 101 may transmit the information about the movement state of the user to an external electronic device (e.g., the external electronic device 510 in FIG. 5B), and the information about the movement state of the user may be displayed on a display of the external electronic device 510.

Referring to FIG. 5B, according to various embodiments, the electronic device 101 may include a first communication circuit 505 (e.g., the wireless communication module 192 in FIG. 1), an acceleration sensor 503, and a first processor 120a (e.g., the processor 120 in FIG. 1) and/or the display 220. The first communication circuit 505 may include, for example, a cellular communication module or a short-range wireless communication module (e.g., a Bluetooth communication module). The first processor 120a may perform at least some of the operations of the processor 120 illustrated in FIG. 5a.

According to various embodiments, the external electronic device 510 may include a second communication circuit 511, a third communication circuit 513, and/or a second processor 515. The second communication circuit 511 may perform at least some of the operations of the communication circuit 501 illustrated FIG. 5a. The third communication circuit 513 may include, for example, a cellular communication module or a short-range wireless communication module (e.g., a Bluetooth communication module). The second processor 515 may perform at least some of the operations of the processor 120 illustrated in FIG. 5A.

A description redundant to that of FIG. 5A will be avoided herein.

As compared to FIG. 5A, the communication circuit 501 is included in the external electronic device 510, instead of the electronic device 101 in the embodiment of FIG. 5B. For example, the external electronic device 510 may transmit and/or receive a communication signal (e.g., a GPS signal) to and/or from an external device through the second communication circuit 511, and the second processor 515 may identify real-time location information about the external electronic device 510, the movement state (e.g., movement distance and/or movement direction) of the external electronic device 510, and/or the movement speed of the external electronic device 510. When the user is moving while carrying both the electronic device 101 and the external electronic device 510, the real-time location information about the external electronic device 510, the movement state (e.g., movement distance and/or movement direction) of the external electronic device 510, and the movement speed of the external electronic device 510 may correspond to (e.g., be identical to or similar to) real-time location information about the electronic device 101, the movement state (e.g., movement distance and/or movement direction) of the electronic device 101, and the movement speed of the electronic device 101. The external electronic device 510 may provide the electronic device 101 with the real-time location information about the external electronic device 510, information about the movement state (e.g., movement distance and/or movement direction) of the external electronic device 510, and information about the movement speed of the external electronic device 510 through the third communication circuit 513, and the electronic device 101 may use the received information to perform the operations of the processor 120, as described with reference to FIG. 5A. In another example, the electronic device 101 may provide information about the movement speed (e.g., the second movement speed) identified by using the acceleration sensor 503 through the first communication circuit 505, and the external electronic device 510 may perform the operations of the processor 120, as described with reference to FIG. 5A, based on the received information.

Figure 6:
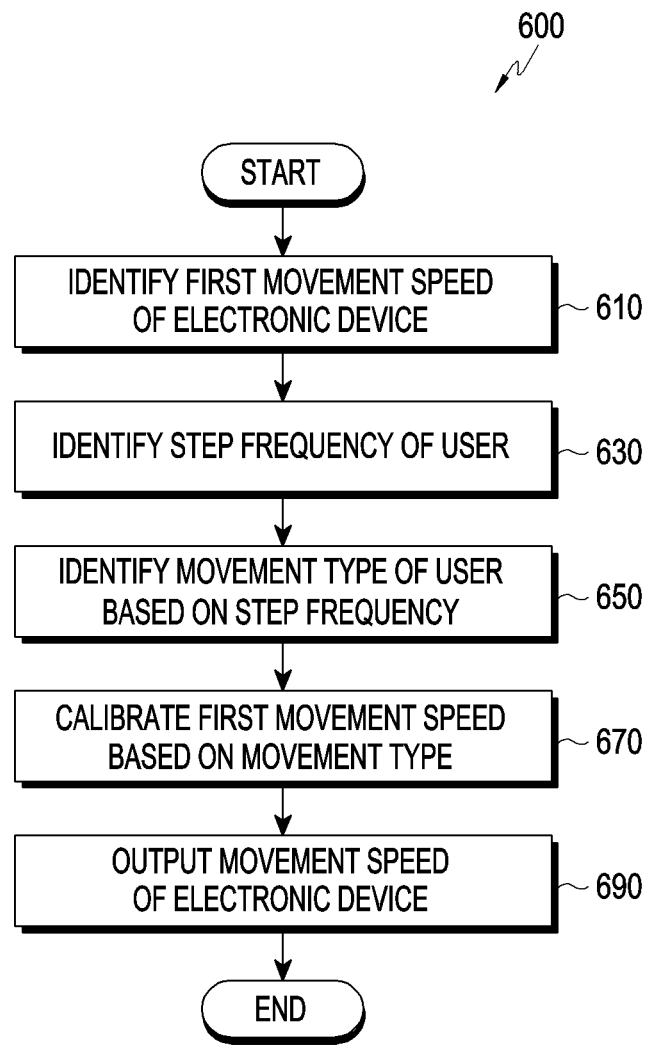
FIG. 6 is a flowchart illustrating a method of calibrating a first movement speed by an electronic device according to various embodiments.

FIG. 6 is a flowchart 600 illustrating a method of calibrating a first movement speed by an electronic device (e.g., the electronic device 101 in FIG. 1) according to various embodiments.

According to various embodiments, a series of operations described below may be implemented as instructions that may be executed by the processor (e.g., the processor 120 in FIG. 1) of the electronic device 101.

According to various embodiments, in operation 610, the electronic device 101 may identify a first movement speed of the electronic device 101. For example, the first movement speed may be identified repeatedly through every cycle in which the electronic device 101 receives a GPS signal (e.g., every second, if GPS signals are received each second).

According to various embodiments, in operation 630, the electronic device 101 may identify a step frequency of the user. For example, the electronic device 101 may identify the step frequency of the user by using the acceleration sensor (e.g., the acceleration sensor 503 in FIG. 5A).

According to various embodiments, in operation 650, the electronic device 101 may identify a movement type of the user based on the step frequency. For example, the movement type of the user may include at least one of a stationary state, a walking state, or a running state. When it is identified that the identified step frequency falls within a first range (e.g., equal to or larger than 0 Hz and less than 1.6 Hz), the electronic device 101 may identify that the movement type of the user is the stationary state. When it is identified that the identified step frequency falls within a second range (e.g., equal to or larger than 1.6 Hz and less than 3 Hz), the electronic device 101 may identify that the movement type of the user is the walking state. When it is identified that the identified step frequency falls within a third range (e.g., 3 Hz or larger), the electronic device 101 may identify that the movement type of the user is the running state. The ranges into which the step frequency may fall are exemplary, and the electronic device 101 may identify a range including the step frequency among two or fewer ranges or four or more ranges. The movement types of the user are exemplary, and the electronic device 101 may identify the movement type of the user among two or fewer movement types (e.g., a stationary state or a moving state) or four or more movement types (e.g., a stationary state, a walking state, a slow running state, and a fast running state).

According to various embodiments, in operation 670, the electronic device 101 may calibrate the first movement speed based on the detected movement type. For example, the electronic device 101 may calibrate the first movement speed based on whether the movement type of the user has been changed, which will be described in more detail with reference to the drawings.

According to various embodiments, the electronic device 101 may output a movement speed of the electronic device 101 in operation 690. For example, the electronic device 101 may identify the calibrated first movement speed as the current movement speed of the electronic device 101 and output the identified movement speed through the display (e.g., the display 220 in FIG. 2). In another example, the electronic device 101 may identify the current movement speed of the electronic device 101 as a combination of the calibrated first movement speed of the electronic device 101 and a second movement speed identified using the acceleration sensor. In another example, the electronic device 101 may audibly output the movement speed of the electronic device 101 through a speaker (e.g., the sound output module 155 in FIG. 1) (e.g., the electronic device 101 may indicate that the current movement speed has reached to a user-input target speed by a notification sound).

Figure 7:
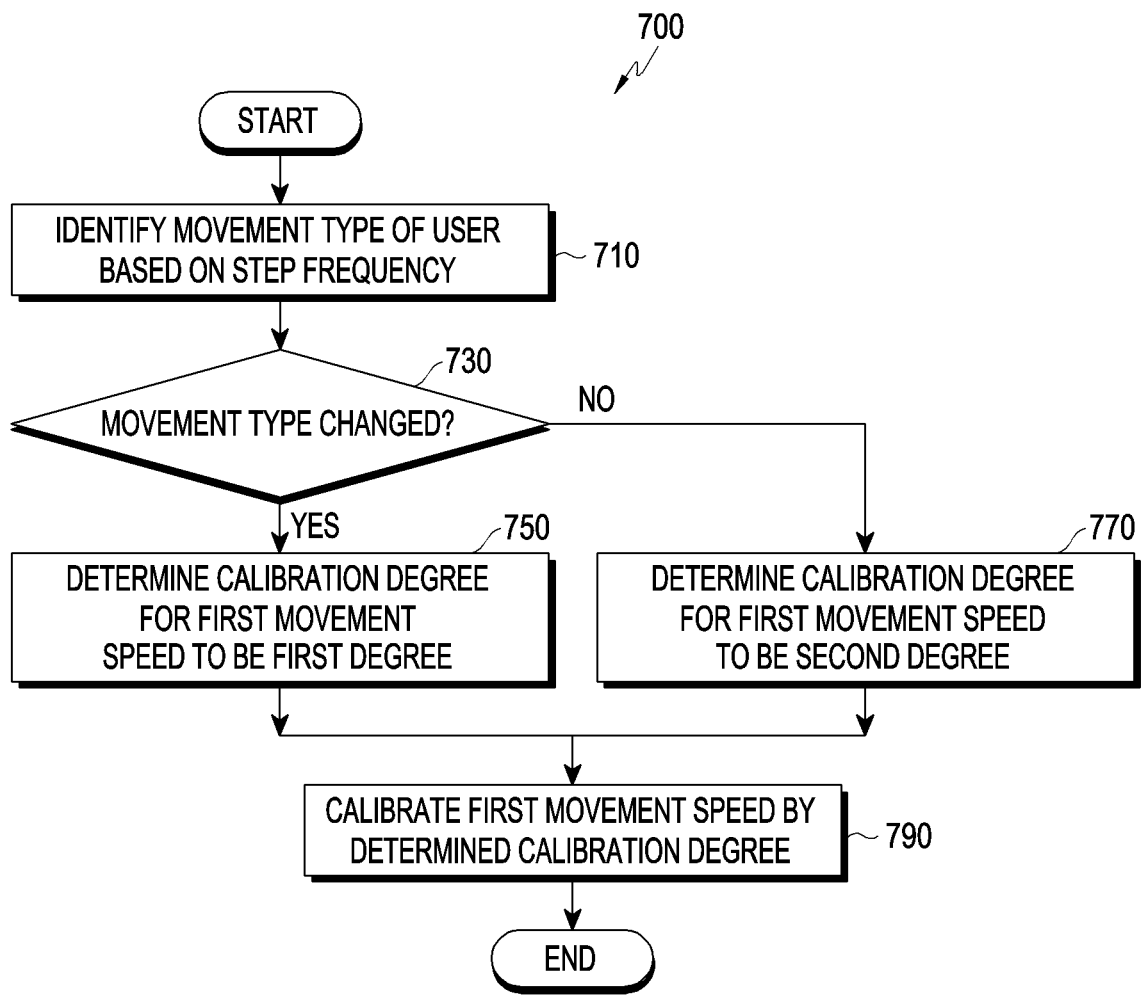
FIG. 7 is a flowchart illustrating a method of calibrating a first movement speed based on whether a movement type of a user has been changed by an electronic device according to various embodiments.

FIG. 7 is a flowchart 700 illustrating a method of calibrating a first movement speed based on whether the movement type of a user has been changed by an electronic device (e.g., the electronic device 101 in FIG. 1) according to various embodiments.

According to various embodiments, a series of operations described below may be implemented as instructions that may be executed by the processor of the electronic device 101 (e.g., the processor 120 in FIG. 1). According to various embodiments, in operation 710, the electronic device 101 may identify a movement type of the user based on a step frequency. For example, the movement type of the user may include at least one of a stationary state, a walking state, and a running state.

According to various embodiments, the electronic device 101 may identify whether the movement type is changed in operation 730. For example, by monitoring the step frequency, or redetecting the step frequency at given intervals, the electronic device 101 may identify whether the movement type of the user is changed from a previously detected movement type (e.g., from any one of the stationary state, the walking state, and the running state to another state).

According to various embodiments, when identifying that the movement type is changed, the electronic device 101 may determine a calibration degree for the first movement speed to be a first degree in operation 750. For example, when identifying that the movement type of the user is changed from a previously detected movement type (e.g., from any one of the stationary state, the walking state, and the running state to another state), the electronic device 101 may determine the calibration degree for the first movement speed to be a first degree.

According to various embodiments, when identifying that the movement type of the user is not changed (e.g., identifying that any one of the stationary state, the walking state, and the running state has not been changed to another state during a predetermined time or longer), the electronic device 101 may determine the calibration degree for the first movement speed to be a second degree in operation 770. For example, the second degree may be a larger degree than the first degree of operation 750.

According to various embodiments, the electronic device 101 may calibrate the first movement speed by the determined calibration degree in operation 790. For example, when determining the calibration degree to be the first degree, the electronic device 101 may apply weak calibration to the first movement speed. For example, when determining the calibration degree to be the second degree, the electronic device 101 may apply strong calibration to the first movement speed.

According to an embodiment, the electronic device 101 may determine the calibration degree for the first movement speed based on a variation of the step frequency of the user. For example, when the variation of the step frequency of the user is equal to or greater than a predetermined value (e.g., 1 Hz), the electronic device 101 may apply weak calibration to the first movement speed. For example, when the variation of the step frequency of the user is less than the predetermined value (e.g., 1 Hz), the electronic device 101 may apply strong calibration to the first movement speed.

For example, in the case where the user started to exercise, when the user has started running, determines that the user has reached a target speed, and thus wants to check a current speed, when the user wants to check a current pace while running at a constant speed, and/or when the user wants to stop running and recording, the user carrying the electronic device 101 may want to check a real-time movement speed on a screen. According to the above-described method of adaptively calibrating a GPS signal-based speed, when the user starts to run in the stationary state and checks the screen or when the user stops running and checks the screen, the electronic device 101 may quickly provide a real-time movement speed corresponding to the current movement state of the user. Further, when the user checks the screen while walking or running at a constant speed (e.g., only with a slight speed variation), the electronic device 101 may provide a stable (e.g., without shaking) speed value as a real-time movement speed.

Figure 8:
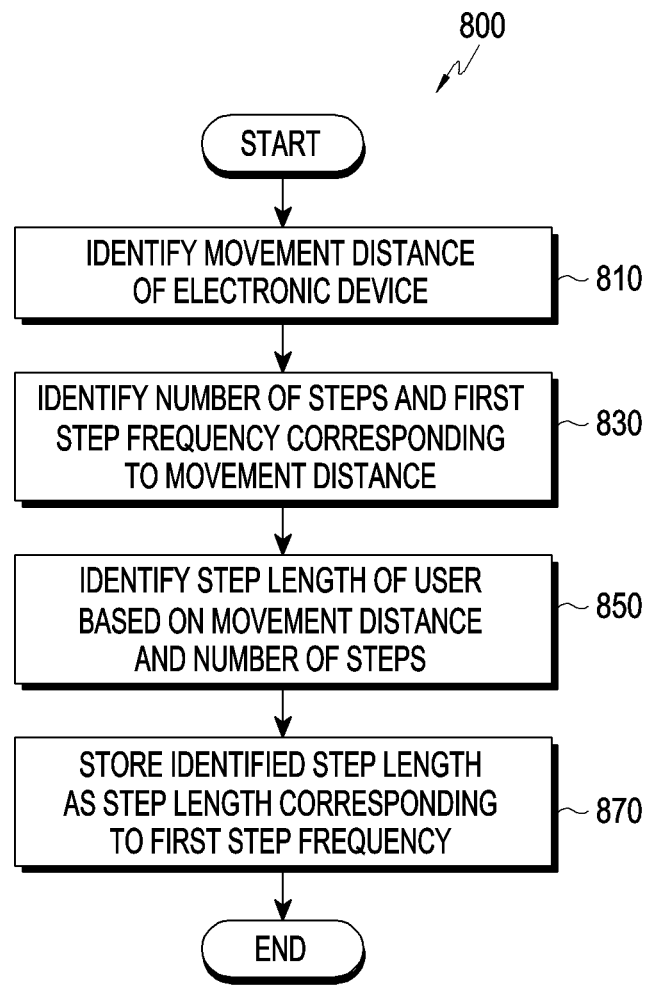
FIG. 8 is a flowchart illustrating a method of learning a step length of a user by an electronic device according to various embodiments.

FIG. 8 is a flowchart 800 illustrating a method of learning a step length of a user by an electronic device (e.g., the electronic device 101 in FIG. 1) according to various embodiments.

According to various embodiments, a series of operations described below may be implemented as instructions that may be executed by the processor (e.g., the processor 120 in FIG. 1) of the electronic device 101.

According to various embodiments, the electronic device 101 may identify a movement distance of the electronic device 101 in operation 810. For example, the electronic device 101 may identify real-time location information about the electronic device 101 based on GPS signals received through a communication circuit (e.g., the communication circuit 501 in FIG. 5A) and identify a distance that the electronic device 101 has moved based on the real-time location information.

According to various embodiments, the electronic device 101 may identify a number of steps and a first step frequency corresponding to the movement distance in operation 830. For example, the electronic device 101 may use an acceleration sensor (e.g., the acceleration sensor 503 in FIG. 5A) to identify the number of steps taken by the user and the first step frequency of the user while the user has moved the distance in operation 810.

According to various embodiments, the electronic device 101 may identify a step length of the user based on the movement distance and the number of steps in operation 850. For example, the electronic device 101 may identify the step length of the user based on Equation 1.

$$\text{training step length}(k) = \frac{\text{distance by } GPS}{\text{step count}} \quad \text{[Equation 1]}$$

In Equation 1, "k" may represent the first step frequency, "distance by GPS" may represent a movement distance identified based on GPS signals (e.g., the movement distance in operation 810), "step count" may be the number of steps of the user (e.g., the number of steps in operation 830), and "training step length (k)" may represent the step length of the user corresponding to the first step frequency k.

As described above, the electronic device 101 may "learn" (e.g., estimate and/or generate) the step length of the user corresponding to each of various step frequencies by repeating the operations of identifying a movement distance based on GPS signals, identifying a step length of the user by dividing the movement distance by the number of steps taken during the movement for the distance, and identifying the identified step length of the user by matching the identified step length to the step frequency during the movement for the distance.

According to various embodiments, the electronic device 101 may identify at least one of the quality of GPS signals, the consistency of a step frequency, or a movement path of the user, as a prerequisite for learning a step length of the user corresponding to a step frequency. When identifying that the at least one of the learning conditions is satisfied, the electronic device 101 may learn the step length of the user corresponding to each step frequency. For example, when identifying that the strengths of GPS signals are equal to or greater than a predetermined strength, signal-to-noise ratios (SNRs) (e.g., CNRs) of the GPS signals are equal to or greater than a predetermined value, a GPS speed estimation error covariance value is less than a predetermined value, or the number of satellites that have transmitted the received GPS signals is equal to or greater than a predetermined number, the electronic device 101 may identify that the quality of the GPS signal is satisfied as a condition for learning a step length of the user. For example, when identifying that a step frequency variation identified in real time is less than a predetermined value, the electronic device 101 may identify that the consistency of the step frequency is satisfied as a condition for learning a step length of the user. The consistency of a step frequency may mean that the user carrying the electronic device 101 is moving at a constant speed and/or with a constant step length. For example, when the electronic device 101 may track real-time location information about the electronic device 101, and identifies that a movement path (e.g., a movement direction) of the electronic device 101 is a straight line path (or a path running in a direction substantially close to a straight line), the electronic device 101 may identify that the movement path of the user is satisfied as a condition for learning a step length of the user. The electronic device 101 may identify whether the movement path of the electronic device 101 runs in a linear direction (or a direction substantially close to a straight line), for example, by identifying whether a direction connecting the location of the electronic device 101 at a first time point to the location of the electronic device 101 at a second time point that is the next time point is identical to (or similar to) a direction connecting the location of the electronic device 101 at the first time point to the location of the electronic device 101 at a third time point that is the next time point to the second time point. In another example, the electronic device 101 may identify whether the movement path of the electronic device 101 runs in a linear direction (or a direction substantially close to a straight line), for example, by identifying whether the direction connecting the location of the electronic device 101 at the first time point to the location of the electronic device 101 at the second time point that is the next time point is identical to (or similar to) a direction connecting the location of the electronic device 101 at the second time point to the location of the electronic device 101 at the third time point that is the next time point to the second time point. In another example, The electronic device 101 may identify whether the movement path of the electronic device 101 runs in a linear direction (or a direction substantially close to a straight line), for example, by identifying whether the sum of linear distances between the locations of the electronic device 101 identified at every predetermined time interval from the first time point to the second time point is identical to (or similar to) the linear distance between the location of the electronic device 101 at the first time point and the location of the electronic device 101 at the second time point.

According to various embodiments, the electronic device 101 may store the identified step length corresponding to the first step frequency in operation 870. For example, the electronic device 101 may identify a scale factor from the identified step length based on Equation 2 and store the identified step length as the scale factor by mapping the step length to the first step frequency in the memory (e.g., the memory 130 in FIG. 1).

$$\text{scale factor}(k) = \frac{\text{training step length}(k)}{\text{default step length}} \quad \text{[Equation 2]}$$

In Equation 2, "k" may represent the first step frequency, "training step length (k)" may represent the step length of the user corresponding to the first step frequency k, "default step length" may be a predetermined value as the average step length of general users or a value estimated (or expected) from the height of the user of the electronic device 101, and "scale factor (k)" may be a scale factor corresponding to the first step frequency k.

The electronic device 101 may store a scale factor corresponding to each of various step frequencies, for example, in the form of an array of data illustrated in Table 1.

TABLE 1

| SF(0) | SF(1) | ... | SF(k) | ... | SF(n) |
|-------|-------|-----|-------|-----|-------|

In Table 1, "SF" may represent a scale factor, and "SF(k)" may represent a scale factor corresponding to a step frequency with magnitude k. Listing 0, 1, . . . , n as values of k in Table 1 is exemplary, and k may be set to values corresponding to various step frequency values or various step frequency ranges.

According to an embodiment, the electronic device 101 may store each identified step length of the user by mapping the step length to a corresponding step frequency, instead of a scale factor.

Figure 9:
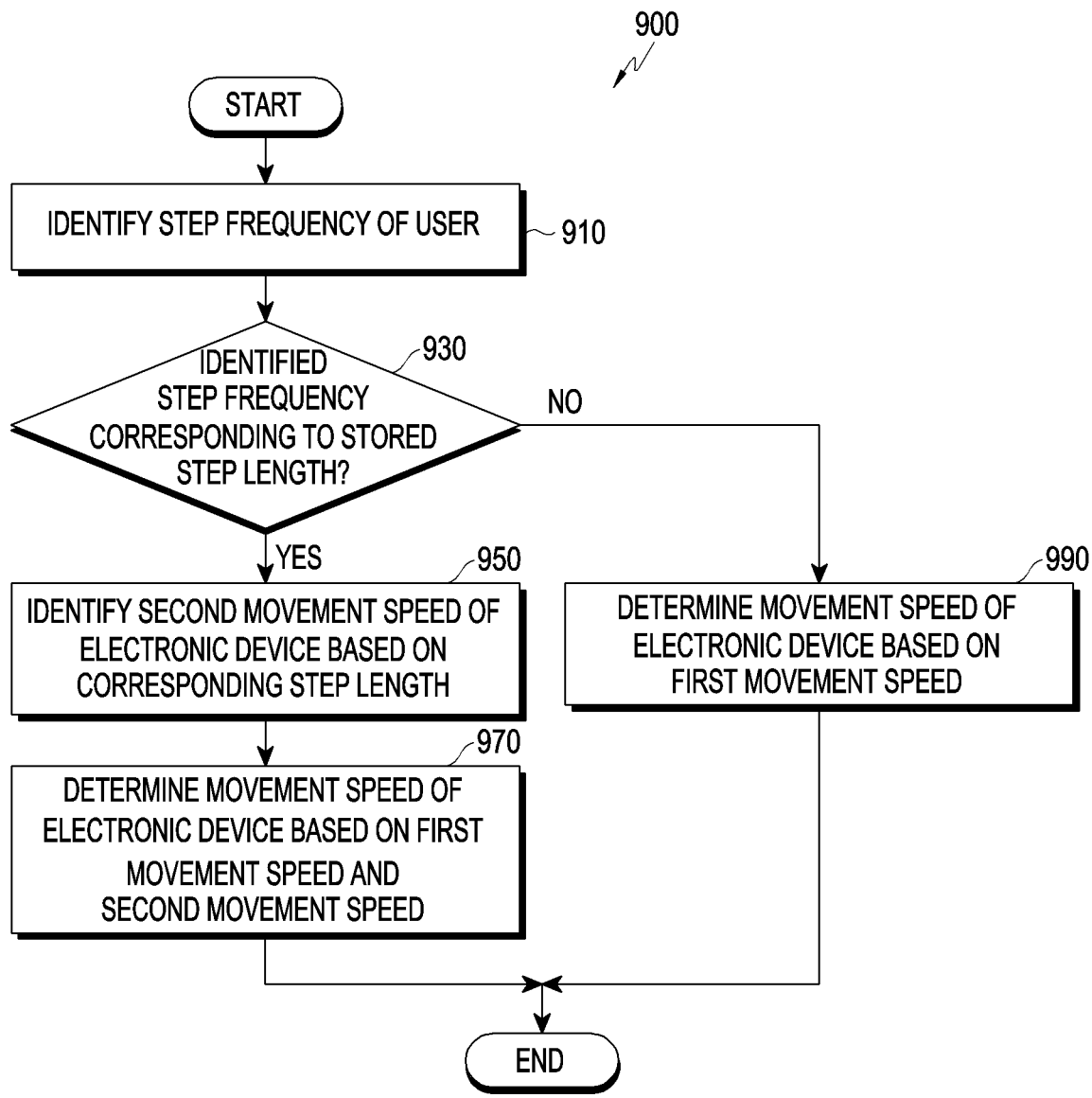
FIG. 9 is a flowchart illustrating a method of determining a movement speed of an electronic device by combining a second movement speed based on a learned step length of a user with a first movement speed by the electronic device according to various embodiments.

FIG. 9 is a flowchart 900 illustrating a method of determining a movement speed of an electronic device (e.g., the electronic device 101 in FIG. 1) by combining a second movement speed based on a learned step length of a user with a first movement speed by the electronic device 101 according to various embodiments.

According to various embodiments, a series of operations described below may be implemented as instructions that may be executed by the processor (e.g., the processor 120 in FIG. 1) of the electronic device 101.

According to various embodiments, the electronic device 101 may identify a step frequency of the user in operation 910. For example, the electronic device 101 may identify the step frequency of the user using the acceleration sensor (e.g., the acceleration sensor 503 in FIG. 5A).

According to various embodiments, the electronic device 101 may identify whether the identified step frequency corresponds to a stored step length in operation 930. For example, the electronic device 101 may identify whether there is data (e.g., a scale factor or a step length of the user) corresponding to the identified step frequency by checking the array of data stored via operation 870 of FIG. 8.

According to various embodiments, when identifying that the identified step frequency corresponds to a stored step length, the electronic device 101 may identify a second movement speed of the electronic device 101 based on the data corresponding to the identified step frequency in operation 950. The electronic device 101 may estimate the step length of the user based on Equation 3.

$$\text{calibrated step length} = \text{scale factor}(k) \times \text{default step length} \quad \text{[Equation 3]}$$

In Equation 3, "k" may represent the identified step frequency, "scale factor (k)" may be a scale factor corresponding to the identified step frequency k, and "default step length" may be a predetermined value as an average step length of general users or a step length estimated from the height of the user of the electronic device 101, and "calibrated step length" may be a step length of the user estimated by using data (e.g., the scale factor) corresponding to the identified step frequency k.

According to an embodiment, when the electronic device 101 has learned the step length of the user by storing each identified step length of the user in correspondence with the corresponding step frequency, the electronic device 101 may estimate the step length by using the data (e.g., the step length of the user) corresponding to the identified step frequency k.

According to various embodiments, the electronic device 101 may identify a second movement speed of the electronic device 101 by using the step length of the user, as estimated based on the identified step frequency. For example, the electronic device 101 may identify the second movement speed of the electronic device 101 by multiplying the identified step frequency by the estimated step length of the user.

According to various embodiments, the electronic device 101 may determine the movement speed of the electronic device 101 based on the first movement speed and the second movement speed in operation 970. For example, the electronic device 101 may determine weights for the first movement speed and the second movement speed based on at least one of the quality of signals (e.g., GPS signals) received through the communication circuit 501 (e.g., the strengths of the GPS signals, the SNRs (e.g., CNRs) of the GPS signals, a GPS speed estimation error covariance, or the number and/or number change of satellites that have transmitted the GPS signals), whether a step-based speed (e.g., the second movement speed) has been learned, or the movement path (e.g., linear or curved path) of the electronic device 101, and determine the movement speed of the electronic device 101 by combining the first movement speed and the second movement speed based on the determined weights, which will be described later in more detail with reference to the drawings. According to an embodiment, the electronic device 101 may determine the average value of the first movement speed and the second movement speed as the movement speed of the electronic device 101, without considering the at least one of the quality of signals (e.g., GPS signals) received through the communication circuit 501 (e.g., the strengths of the GPS signals, the SNRs (e.g., CNRs) of the GPS signals, a GPS speed estimation error covariance, or the number and/or number change of satellites that have transmitted the GPS signals), whether the step-based speed (e.g., the second movement speed) has been learned, or the movement path (e.g., linear or curved path) of the electronic device 101.

According to various embodiments, when identifying that the identified step frequency does not correspond to any stored step length, the electronic device 101 may determine the movement speed of the electronic device 101 based on the first movement speed in operation 990. For example, when identifying that there is no data (e.g., a scale factor) corresponding to the identified step frequency, the electronic device 101 may determine the first movement speed to be the movement speed of the electronic device 101, without identifying the second movement speed.

According to various embodiments, the electronic device 101 may output the movement speed determined in operation 970 or 990 through an output device. For example, the electronic device 101 may output the determined movement speed as visual information through the display (e.g., the display 220 in FIG. 2). In another example, the electronic device 101 may transmit information about the determined movement speed to an external electronic device (e.g., the external electronic device 510 in FIG. 5B), and the transmitted information may be displayed as visual information on a display (not shown) of the external electronic device 510.

Figure 10:
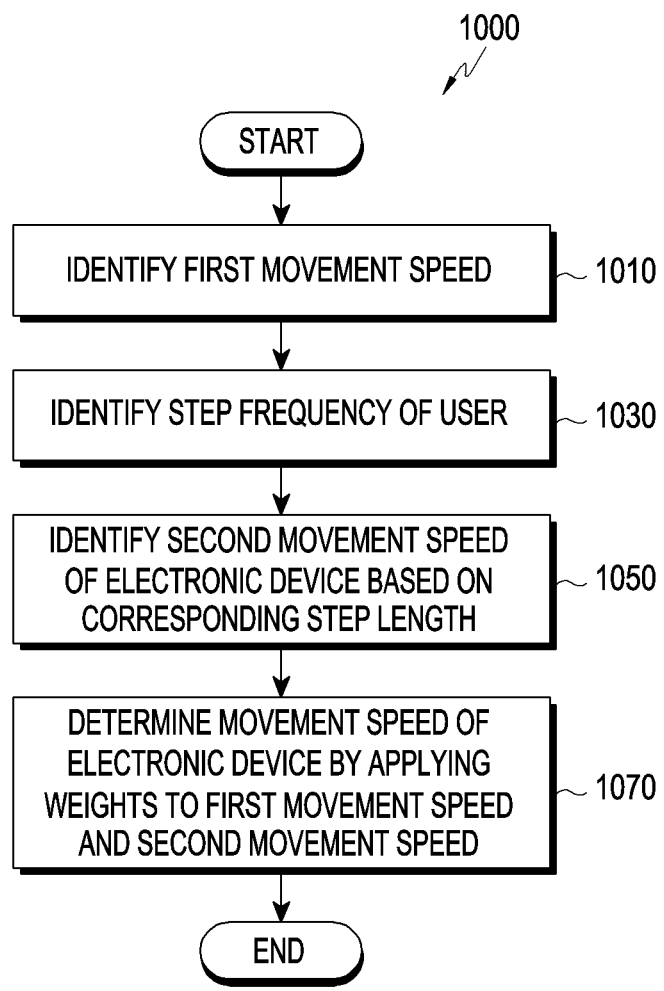
FIG. 10 is a flowchart illustrating a method of determining a movement speed of an electronic device by applying weights to a first movement speed and a second movement speed by the electronic device according to various embodiments.

FIG. 10 is a flowchart 1000 illustrating a method of determining a movement speed of an electronic device (e.g., the electronic device 101 in FIG. 1) by applying weights to a first movement speed and a second movement speed by the electronic device 101 according to various embodiments.

According to various embodiments, a series of operations described below may be implemented as instructions that may be executed by the processor (e.g., the processor 120 in FIG. 1) of the electronic device 101.

According to various embodiments, the electronic device 101 may identify a first movement speed in operation 1010. For example, the first movement speed of FIG. 10 may be a movement speed identified based on GPS signals (e.g., a first movement speed before calibration) or a first movement speed calibrated based on a movement type of the user.

According to various embodiments, the electronic device 101 may identify a step frequency of the user in operation 1030. For example, the electronic device 101 may identify the step frequency of the user by using the acceleration sensor (e.g., the acceleration sensor 503 in FIG. 5A).

According to various embodiments, the electronic device 101 may identify a second movement speed of the electronic device 101 based on a corresponding step length in operation 1050. For example, the electronic device 101 may estimate the step length of the user by checking data (e.g., a scale factor and/or a step length of the user) corresponding to the identified step frequency, and identify the second movement speed based on the identified step frequency and the estimated step length of the user.

According to various embodiments, the electronic device 101 may determine a movement speed of the electronic device 101 by applying weights to the first movement speed and the second movement speed in operation 1070.

For example, the movement speed of the electronic device 101 may be determined based on Equation 4.

$$V = V_{GPS} \times a + V_{ped} \times (1-a), (0 \leq a \leq 1) \quad \text{[Equation 4]}$$

In Equation 4, "$V_{GPS}$" may represent the first movement speed determined based on GPS signals, "$V_{ped}$" may represent the second movement speed determined based on the estimated step length of the user, "a" may be a weight, and "V" may represent the movement speed of the electronic device 101 identified by applying the weights to the first movement speed and the second movement speed.

For example, the weight a may be determined based on at least one of the quality of signals (e.g., GPS signals) received through the communication circuit 501 (e.g., the strengths of the GPS signals, the SNRs (e.g., CNRs) of the GPS signals, a GPS speed estimation error covariance, or the number and/or number change of satellites that have transmitted the GPS signals), whether a step-based speed (e.g., the second movement speed) has been learned, or a movement path (e.g., linear or curved path) of the electronic device 101.

For example, when the strengths of the GPS signals are equal to or greater than a predetermined strength, the SNRs (e.g., CNRs) of the GPS signals are equal to or greater than a predetermined value, the GPS speed estimation error covariance is less than a predetermined value, or the number of satellites that have transmitted the received GPS signals is equal to or greater than a predetermined number, the weight a may be determined as a value equal to or greater than 0.5.

For example, when there is the data (e.g., the scale factor and/or the step length of the user) corresponding to the identified step frequency, it may be identified that the step-based speed (e.g., the second movement speed) has been learned for the identified step frequency. In this case, the weight a may be determined to be less than 0.5. For example, when there is no data (e.g., no scale factor and/or no step length of the user) corresponding to the identified step frequency, the weight a may be determined to be 1, and in this case, the above-described operation 1030 may be skipped. In another example, when there is no data (e.g., no scale factor and/or no step length of the user) corresponding to the identified step frequency, the data corresponding to the identified step frequency may be stored through learning based on the step frequency identified by performing the operations of FIG. 8.

For example, when the movement path of the electronic device 101 is a straight line path, the weight a may be determined to be less than 0.5, and when the movement path of the electronic device 101 is a curved path, the weight a may be determined to be 0.5 or larger.

In another example, when it is identified that the estimation accuracy of a latitude and a longitude and/or the first movement speed based on the GPS signals is high, the weight a may be determined to be 0.5 or larger.

In another example, when it is identified that the identified first movement speed and/or second movement speed is less than or equal to a predetermined value (in other words, a slow speed), the weight a may be determined to be less than 0.5.

Figure 11:
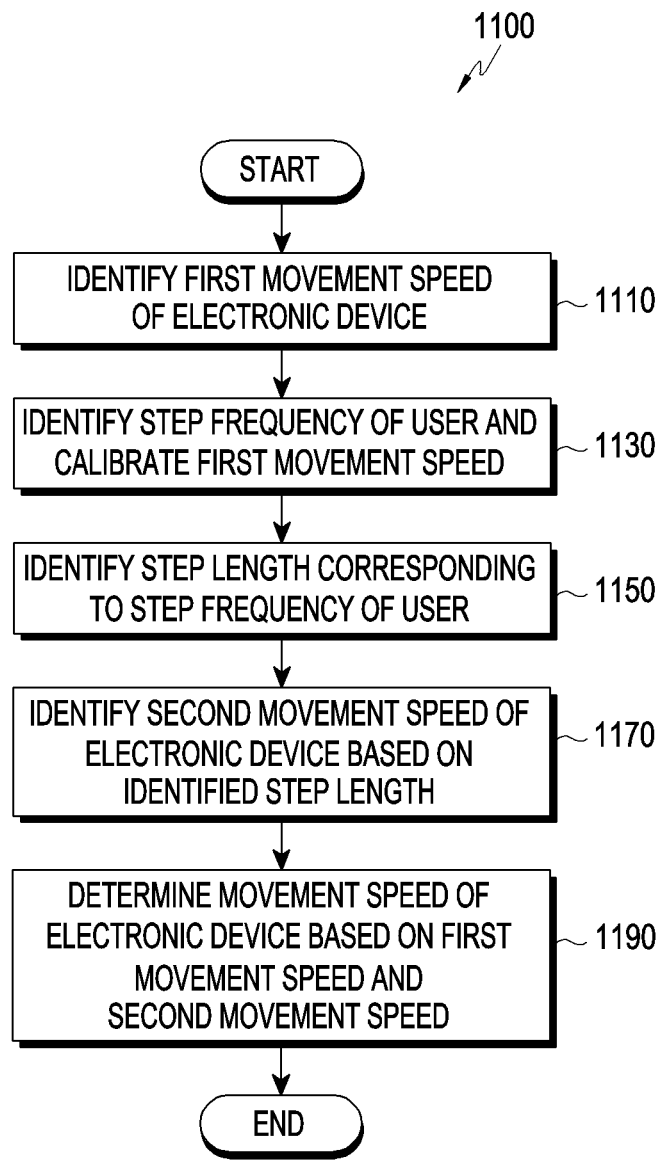
FIG. 11 is a flowchart illustrating a method of determining a movement speed of an electronic device based on a first movement speed and a second movement speed by the electronic device according to various embodiments.

FIG. 11 is a flowchart 1100 illustrating a method of determining, by an electronic device (e.g., the electronic device 101 of FIG. 1), a movement speed of the electronic device 101 based on a first movement speed and a second movement speed according to various embodiments. A description redundant to the foregoing descriptions given with reference to the drawings is avoided herein.

According to various embodiments, a series of operations described below may be implemented as instructions that may be executed by the processor (e.g., the processor 120 of FIG. 1) of the electronic device 101.

According to various embodiments, the electronic device 101 may identify a first movement speed of the electronic device 101 in operation 1110. For example, the electronic device 101 may identify the first movement speed of the electronic device 101 by using real-time location information about the electronic device 101 and/or the Doppler effect (e.g., Doppler shift).

According to various embodiments, the electronic device 101 may identify a step frequency of the user to calibrate the first movement speed in operation 1130. For example, the electronic device 101 may identify a movement type (e.g., a stationary state, a walking state, or a running state) of the user according to the step frequency, determine a calibration degree based on the identified movement type (e.g., based on whether the movement type has been changed), and calibrate the first movement speed according to the determined calibration degree.

According to various embodiments, the electronic device 101 may identify a step length corresponding to the step frequency of the user in operation 1150. For example, the electronic device 101 may identify (e.g., estimate) the step length corresponding to the step frequency of the user based on stored data (e.g., a scale factor and/or a step length of the user) corresponding to the step frequency of the user.

According to various embodiments, the electronic device 101 may identify a second movement speed of the electronic device 101 based on the identified (e.g., estimated) step length in operation 1170. For example, the electronic device 101 may identify the second movement speed of the electronic device 101 by multiplying the identified step frequency by the identified (e.g., estimated) step length of the user.

According to various embodiments, the electronic device 101 may determine a movement speed of the electronic device 101 based on the first movement speed and the second movement speed in operation 1190. For example, the electronic device 101 may apply weights to the first movement speed of operation 1110 or the calibrated first movement speed of operation 1130, and the second movement speed of operation 1170 to determine the movement speed of the electronic device 101.

Figure 12:
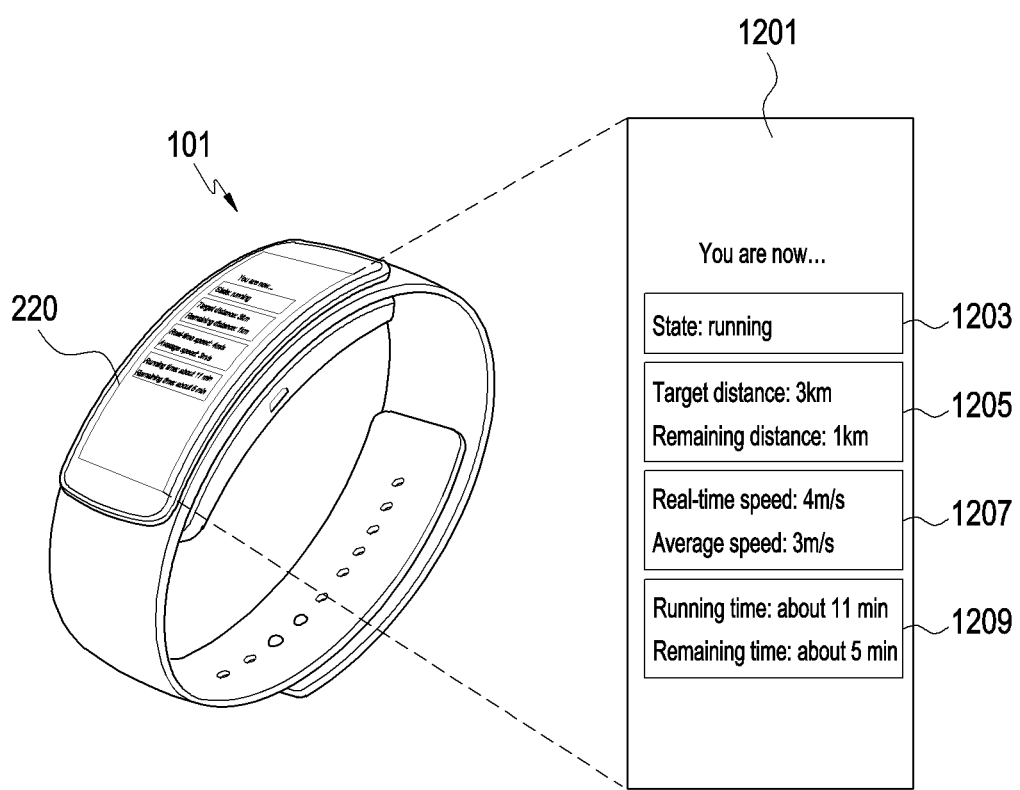
FIG. 12 is a diagram illustrating a screen showing information about a movement state of a user, displayed on a display of an electronic device according to various embodiments.

FIG. 12 illustrates a screen 1201 indicating information about a movement state of a user, displayed on the display 220 of the electronic device 101 according to various embodiments.

According to various embodiments, information about the movement state of the user may be displayed on the display 220 of the electronic device 101. For example, the information about the movement state of the UE may include at least one of information about a movement type, information about a distance (e.g., a target distance and/or the remaining distance to a target), information about a speed (e.g., a real-time speed and/or an average speed), or information about a time (e.g., a running time and/or a remaining time).

For example, a state 1203, "running" may be displayed as the information about the movement type. According to various embodiments, the movement type may be identified based on a range which the step frequency of the UE falls into.

For example, a target distance, "3 km" and a remaining distance, "1 km" may be displayed as distance information 1205. According to various embodiments, the target distance, which is a value previously input by the user, may be a target value that the user walks or runs to reach. According to various embodiments, the remaining distance may be identified by subtracting the distance that the user has actually moved from a starting point from the target distance.

For example, a real-time speed "4 m/s" and an average speed "3 m/s" may be displayed as speed information 1207. According to various embodiments, the real-time speed may be a first movement speed, a calibrated first movement speed, a second movement speed, or a movement speed of the electronic device 101 determined based on weights. According to various embodiments, the average speed may be identified by dividing the distance that the user and the electronic device 101 have actually moved by a time elapsed from the starting time.

For example, a running time "about 11 min" and a remaining time "about 5 min" may be displayed as time information 1209. According to various embodiments, the running time (or walking time) may be a time elapsed from a starting time. According to various embodiments, the remaining time may be identified by dividing the remaining distance by the average speed. According to an embodiment, the remaining time may be identified by dividing the remaining distance by a real-time speed.

According to various embodiments, an electronic device may include a communication circuit, an acceleration sensor, and at least one processor, and the at least one processor may be configured to identify a first movement speed of the electronic device by using the communication circuit, identify a step frequency of a user by using the acceleration sensor, identify a movement type of the user based on the identified step frequency, and output a movement speed of the electronic device by calibrating the first movement speed based on the identified movement type.

According to various embodiments, the at least one processor may be further configured to identify whether the movement type has been changed, and based on identifying that the movement type has been changed, determine a calibration degree for the first movement speed to be a first degree.

According to various embodiments, the at least one processor may be further configured to identify whether the movement type has been changed, and based on identifying that the movement type is maintained for a predetermined time or longer, determine a calibration degree for the first movement speed to be a second degree.

According to various embodiments, the at least one processor may be further configured to, based on the identified step frequency being included in a first range, identify that the movement type is a stationary state, based on the identified step frequency being included in a second range, identify that the movement type is a walking state, and based on the identified step frequency being included in a third range, identify that the movement type is a running state.

According to various embodiments, the at least one processor may be further configured to identify a movement distance of the electronic device by using the communication circuit, identify a number of steps and a first step frequency of the user corresponding to the movement distance by using the acceleration sensor, identify a first step length of the user based on the identified movement distance and the identified number of steps, and store the identified first step length as a step length corresponding to the first step frequency.

According to various embodiments, the at least one processor may be further configured to, based on identifying that the step frequency of the user is the first step frequency, estimate the stored first step length as a step length of the user, and identify a second movement speed of the electronic device based on the estimated step length.

According to various embodiments, the at least one processor may be further configured to identify the movement speed of the electronic device by applying weights to the calibrated first movement speed and the second movement speed.

According to various embodiments, the weights may be determined based on at least one of quality of a signal received through the communication circuit, whether a step length corresponding to the step frequency of the user has been learned, or a movement path of the user.

According to various embodiments, a method of controlling an electronic device may include identifying a first movement speed of the electronic device by using a communication circuit of the electronic device, identifying a step frequency of a user by using an acceleration sensor of the electronic device, identifying a movement type of the user based on the identified step frequency, and outputting a movement speed of the electronic device by calibrating the first movement speed based on the identified movement type.

According to various embodiments, the outputting of a movement speed of the electronic device by calibrating the first movement speed based on the identified movement type may include identifying whether the movement type has been changed, and based on identifying that the movement has been changed, determining a calibration degree for the first movement speed to be a first degree.

According to various embodiments, the outputting of a velocity of the electronic device by calibrating the first movement speed based on the identified movement type may include identifying whether the movement type has been changed, and based on identifying that the movement type is maintained for a predetermined time or longer, determining a calibration degree for the first movement speed to be a second degree.

According to various embodiments, the identifying of a movement type of the user based on the identified step frequency may include, based on the identified step frequency being included in a first range, identifying that the movement type is a stationary state, based on the identified step frequency being included in a second range, identifying that the movement type is a walking state, and based on the identified step frequency being included in a third range, identifying that the movement type is a running state.

According to various embodiments, the method may further include identifying a movement distance of the electronic device by using the communication circuit, identifying the number of steps and a first step frequency of the user corresponding to the movement distance by using the acceleration sensor, identifying a first step length of the user based on the identified movement distance and the identified number of steps, and storing the identified first step length as a step length corresponding to the first step frequency.

According to various embodiments, the method may further include, based on identifying that the step frequency of the user is the first step frequency, estimating the stored first step length as a step length of the user, and identifying a second movement speed of the electronic device based on the estimated step length.

According to various embodiments, the method may include identifying the movement speed of the electronic device by applying weights to the calibrated first movement speed and the second movement speed.

According to various embodiments, the weights may be determined based on at least one of quality of a signal received through the communication circuit, whether a step length corresponding to the step frequency of the user has been learned, or a movement path of the user.

According to various embodiments, an electronic device may include a communication circuit, an acceleration sensor, and at least one processor, and the at least one processor may be configured to identify a first movement speed of the electronic device by using the communication circuit, identify a step frequency of a user by using the acceleration sensor, calibrate the first movement speed based on the identified step frequency, identify a second movement speed of the electronic device by using the acceleration sensor, and output a movement speed of the electronic device based on the calibrated first movement speed and the second movement speed.

According to various embodiments, the at least one processor may be configured to estimate a first step length corresponding to the identified step frequency to be a step length of the user among at least one pre-stored step length, and identify the second movement speed based on the estimated step length.

According to various embodiments, the at least one processor may be further configured to identify the movement speed of the electronic device by applying weights to the calibrated first movement speed and the second movement speed.

According to various embodiments, the weights may be determined based on at least one of quality of a signal received through the communication circuit, whether a step length corresponding to the step frequency of the user has been learned, or a movement path of the user.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., the internal memory 136 or the external memory 138) that is readable by a machine (e.g., the electronic device 101).

For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online (e.g., downloaded or uploaded) via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a communication circuit;
an acceleration sensor;
a processor; and
memory storing instructions that, when executed by the processor, cause the electronic device to:
calculate a first movement speed of the electronic device based on at least two signals received using the communication circuit,
identify a current step frequency of a user based on movements of the user as detected by the acceleration sensor,
identify a movement type of the user based on the identified current step frequency, and
output a current movement speed of the electronic device by filtering the first movement speed and the identified movement type.

2. The electronic device of claim 1, wherein the instructions, when executed by the processor, cause the electronic device to:
after identifying the movement type, continue monitoring the current step frequency of the user to detect whether the movement type is changed, and
based on detecting that the movement type is changed, set a filter degree for the first movement speed to a first degree.

3. The electronic device of claim 1, wherein the instructions, when executed by the processor, cause the electronic device to:
identify whether the movement type is changed, and
based on identifying that the movement type is maintained for a predetermined time or longer, set a filter degree for the first movement speed to be a second degree.

4. The electronic device of claim 1, wherein the instructions, when executed by the processor, cause the electronic device to:
based on detecting that the identified current step frequency is within a first range, identify that the movement type is a stationary state,
based on detecting that the identified current step frequency is within a second range, identify that the movement type is a walking state, and
based on detecting that the identified current step frequency is within a third range, identify that the movement type is a running state.

5. The electronic device of claim 1, wherein the instructions, when executed by the processor, cause the electronic device to:
identify a movement distance traversed by the electronic device based on the at least two signals received using the communication circuit,
identify a number of steps taken by the user while traversing the identified movement distance, and a first step frequency of the user during traversal of the movement distance, as based on the movements of the user as detected by the acceleration sensor,
calculate a first step length of the user, based on the identified movement distance and the identified number of steps, and
store the calculated first step length corresponding to the first step frequency.

6. The electronic device of claim 5, wherein the instructions, when executed by the processor, cause the electronic device to:
based on identifying that the current step frequency of the user matches the identified first step frequency, set the stored first step length as a current estimated step length of the user, and calculate a second movement speed of the electronic device based on the current estimated step length.

7. The electronic device of claim 6, wherein the instructions, when executed by the processor, cause the electronic device to:
calculate the current movement speed of the electronic device by applying weights to the filtered first movement speed and the calculated second movement speed.

8. The electronic device of claim 7, wherein the weights are determined based on at least one of a quality of the at least two signals received using the communication circuit, whether a step length corresponding to the step frequency of the user has been learned, or a shape of a movement path of the user.

9. A method of controlling an electronic device, the method comprising:
   calculating a first movement speed of the electronic device based on at least two signals received using a communication circuit of the electronic device;
   identifying a step frequency of a user based on movements of the user detected using an acceleration sensor of the electronic device;
   identifying a movement type of the user based on the identified step frequency; and
   outputting a current movement speed of the electronic device by filtering the first movement speed and the identified movement type.

10. The method of claim 9, wherein outputting the current movement speed of the electronic device by filtering the first movement speed based on the identified movement type comprises:
   identifying whether the movement type is changed; and
   based on identifying that the movement is changed, setting a filter degree for the first movement speed to a first degree.

11. The method of claim 9, wherein outputting the movement speed of the electronic device by filtering the first movement speed based on the identified movement type comprises:
   identifying whether the movement type is changed; and
   based on identifying that the movement type is maintained for a predetermined time or longer, setting a filter degree for the first movement speed to a second degree.

12. The method of claim 9, wherein identifying the movement type of the user based on the identified step frequency comprises:
   based on detecting that the identified step frequency is included within a first range, identifying that the movement type is a stationary state;
   based on detecting that the identified step frequency is included within a second range, identifying that the movement type is a walking state; and
   based on detecting that the identified step frequency is included within a third range, identifying that the movement type is a running state.

13. The method of claim 9, further comprising:
   identifying a movement distance traversed by the electronic device based on the at least two signals received using the communication circuit;
   identifying a number of steps taken by the user while traversing the identified movement distance, and a first step frequency of the user during traversal of the movement distance, as based on the movements of the user as detected by the acceleration sensor;
   calculate a first step length of the user, based on the identified movement distance and the identified number of steps; and
   storing the calculated first step length corresponding to the first step frequency.

14. The method of claim 13, further comprising:
   based on identifying that a current step frequency of the user matches the first step frequency, setting the stored first step length as a current estimated step length of the user; and
   calculating a second movement speed of the electronic device based on the current estimated step length.

15. The method of claim 14, further comprising calculating the current movement speed of the electronic device by applying weights to the filtered first movement speed and the calculated second movement speed.

16. The method of claim 15, wherein the weights are determined based on at least one of a quality of the at least two signals received using the communication circuit, whether a step length corresponding to the step frequency of the user has been learned, or a shape of a movement path of the user.

17. An electronic device, comprising:
   a communication circuit;
   an acceleration sensor;
   a processor; and
   memory storing instructions that, when executed by the processor, cause the electronic device to:
   calculate a first movement speed of the electronic device based on at least two signals received using the communication circuit,
   identify a current step frequency of a user based on movements of the user as detected by the acceleration sensor,
   based on the identified current step frequency, filtering the first movement speed,
   calculating a second movement speed of the electronic device using at least the current step frequency detected using acceleration sensor, and
   based on the filtered first movement speed and the second movement speed, output a current movement speed of the electronic device.

18. The electronic device of claim 17, wherein the instructions, when executed by the processor, cause the electronic device to:
   select a stored first step length from one or more prestored step lengths based on correspondence to the identified step frequency to be a current estimated step length of the user,
   wherein the second movement speed is calculated based on the current step frequency and the current estimated step length.

19. The electronic device of claim 17, wherein the instructions, when executed by the processor, cause the electronic device to:
   calculate the current movement speed of the electronic device by applying weights to the filtered first movement speed and the second movement speed.

20. The electronic device of claim 19, wherein the weights are determined based on at least one of quality of a signal received through the communication circuit, whether a step length corresponding to the step frequency of the user has been learned, or a shape of a movement path of the user.

* * * * *